United States Patent
Ward

(10) Patent No.: US 6,212,899 B1
(45) Date of Patent: Apr. 10, 2001

(54) APPARATUS AND COOLING SYSTEM

(76) Inventor: Dale Cameron Ward, 11 Oxford Road, sCone New South Wales, 2337 (AU)

(*) Notice: Subject to any disclaimer, the term of this patent is extended or adjusted under 35 U.S.C. 154(b) by 0 days.

(21) Appl. No.: 09/284,034

(22) PCT Filed: Oct. 3, 1997

(86) PCT No.: PCT/AU97/00662

§ 371 Date: Apr. 1, 1999

§ 102(e) Date: Apr. 1, 1999

(87) PCT Pub. No.: WO98/15787

PCT Pub. Date: Apr. 16, 1998

(30) Foreign Application Priority Data

Oct. 14, 1996 (AU) .................................................... P02824
Oct. 3, 1997 (AU) .................................................. 22809/97

(51) Int. Cl.[7] .................................................. B67D 5/62
(52) U.S. Cl. .................................................. 62/389; 62/392
(58) Field of Search ........................... 62/389, 392, 298; 165/163

(56) References Cited

U.S. PATENT DOCUMENTS

| | | | |
|---|---|---|---|
| 4,351,271 | * 9/1982 | Mueller et al. ................ | 119/14.09 |
| 4,730,463 | * 3/1988 | Stanfill ............................... | 62/389 X |
| 4,822,391 | * 4/1989 | Rockenfeller ...................... | 62/376 X |
| 5,129,552 | * 7/1992 | Painchaud et al. ................ | 62/389 X |
| 5,191,773 | * 3/1993 | Cassell .............................. | 62/392 X |
| 5,309,987 | * 5/1994 | Carlson ........................... | 165/163 X |
| 5,379,832 | * 1/1995 | Dempsey ......................... | 165/163 X |

FOREIGN PATENT DOCUMENTS

| | | |
|---|---|---|
| 0 122 900 | 4/1984 | (EP) . |
| 2 532 154 | 9/1982 | (FR) . |
| 1 465 546 | 7/1973 | (GB) . |
| 1409168 | 7/1988 | (SU) . |
| 1617 274 | 12/1990 | (SU) . |
| WO 98/15787 | 4/1998 | (WO) . |

* cited by examiner

*Primary Examiner*—Corrine McDermott
*Assistant Examiner*—Chen-Wen Jiang
(74) *Attorney, Agent, or Firm*—Jenkens & Gilchrist

(57) ABSTRACT

A cooling system particularly but not exclusively for cooling milk transferred for a milking station to a vat along a first flow path, the system including an apparatus for heat exchange with milk passing therethrough, wherein a second flow path is provided for circulating milk in the vat through the apparatus and the second flow path isolated from the first flow path.

11 Claims, 7 Drawing Sheets

APPARATUS AND COOLING SYSTEM

BACKGROUND OF THE INVENTION

1. Field of the Invention

The present invention relates to an apparatus and cooling system particularly, but not exclusively, for use in the food or liquor industry.

2. Description of the Related Art

A known form of cooling system which is utilized in the dairy industry includes a ply heat exchanger for cooling milk from dairy cows to a temperature of about 4° C., to inhibit bacterial growth whilst the milk is in a storage vat awaiting transport to a milk tanker. The bottom of the vat may be formed of a second "dimple plate" heat exchanger which is cooled by refrigerant or chilled water to maintain the milk at a low temperature. A mechanical agitator may also be provided in the vat to circulate the milk so as to maximize efficiency of the dimple plate heat exchanger, prevent separation of the milk particles and also to prevent stratification of the milk.

The plate heat exchanger is form of a plurality of thin plates which are connected in a sandwich type construction. Each plate has chilled water running through it for heat exchange with milk running over the plate. The manifold structure of the plate heat exchanger makes it prone to bacterial contamination. After each milking, the heat exchanger is taken out of line and flushed clean. Less frequently, the entire heat exchanger needs to be disassembled either for removing clogging deposits or for regulatory inspection. Assembly and disassembly of the plate heat exchanger is extremely labor and time consuming.

Aside from the above disadvantages, the conventional milking system has limited capacity for fluctuation in milk volume or flow rate due to limited supply of chilled water. The chilled water is obtained from a water tank, which may be cooled by refrigeration, or from an "ice bank" tank. The dimple plate heat exchanger may also be cooled by chilled water from either the water tank or ice bank tank. Known forms of ice bank tanks and water tanks for use in the above system have a large volume and are usually cooled to, for example, 0° C. overnight to capitalize on offpeak power rates. The volume of the tank is generally sufficient to cater for a day's milking. However, when the amount of milk to be cooled is greater than normal, the capacity of the tank may not be sufficient, and the milk consequently may not be cooled to a low enough temperature. Further, the plate heat exchanger is generally constructed to cool a certain volume of milk over a predetermined time, i.e., at a given cooling rate. If the rate at which milk is collected from the cows is greater than normal, the milk will again not be sufficiently cooled. The capacity of the plate heat exchanger may be increased by connecting more plates to the beat exchanger but this is a rather complicated and time consuming process.

If the milk is not adequately cooled by the plate heat exchanger, supplementary cooling may be effected by the dimple plate exchanger on the bottom of the vat, but such cooling is not as efficient as the plate heat exchanger.

An arrangement is disclosed in GB 1465516 (Alfa-Laval Industrie-Technik GmbH, filed Jul. 14, 1973) where a two stage cooling process is utilized. Milk is firstly pre-cooled by an in-line heat exchanger and delivered to a vat, in a conventional manner. The pre-cooled milk is then recycled back through the heat exchanger after completion, or during interruption, of a milking operation to achieve a storage temperature of about 4° C. The arrangement includes non-return valves for controlling fluid flow during each cooling stage.

OBJECT OF THE INVENTION

The object of the arrangement is to cool and maintain milk at a required storage temperature without the need for additional cooling devices, such as the above described dimple plate heat exchanger, in the vat itself. To applicants knowledge, the arrangement has never been commercially adopted. A possible reason could be regulatory, since the one way valves, essential for correct fluid flow of milk through the heat exchanger, provide ideal sites for bacterial growth. In any event, the arrangement would still have all the attendant disadvantages when used in conjunction with a conventional plate heat exchanger in the above described system.

BRIEF SUMMARY OF THE INVENTION

In accordance with the present invention, there is provided a cooling system for cooling liquid transferred into a vat along a fist flow path, the system including an apparatus for heat exchange with liquid passing therethrough, wherein a second flow path is provided for circulating the liquid in the vat through the apparatus and the second flow path is isolated from the first flow path. Preferably, the apparatus includes a casing through which the liquid flows and a refrigeration element in the form of a cylindrical coil mounted within the casing, the coil having a refrigerant input and refrigerant output provided at one end thereof and the casing including a close portion, remote from the one end of the coil, wherein the closure portion is releasable to allow the casing to be removed by sliding over the coil in a direction away from the one end.

Preferably the system includes a coupling device which is adapted to selectively connect and disconnect the cooling apparatus between the second flow path and a third flow path, the third flow path being for transfer of a second liquid between a storage tank, connected to the coupling device via a pair of transfer pipes arranged to allow flow of the second liquid from the tank to the cooling apparatus and to return the cooled second liquid from the apparatus to the tank, the storage tank being in fluid communication with a plate heat exchanger and first and second conduits being provided to circulate the second liquid from the tank through the heat exchanger and back into the tank.

Preferably, the liquid in the vat comprises milk. Preferably, the second liquid in the tank comprises water.

Preferably, the second flow path is external to the vat.

As can be appreciated from the above, the present invention diverges from known cooling systems in that pre-vat cooling need not be applied. The resulting isolation of the second flow path allows the cooling system of the invention to operate independently of fluid flow in the first flow path, thereby dispensing with the need one way for flow control valves in the second flow path. In addition, the specific construction of the cooling apparatus described above allows for ready inspection and cleaning of the apparatus, as compared with a known plate heat exchanger.

BRIEF DESCRIPTION OF THE DRAWINGS

The invention is more fully described, by way of non-limiting example only, with reference to the accompanying drawings in which.

DETAILED DESCRIPTION OF THE PRESENT INVENTION

Figure 1:
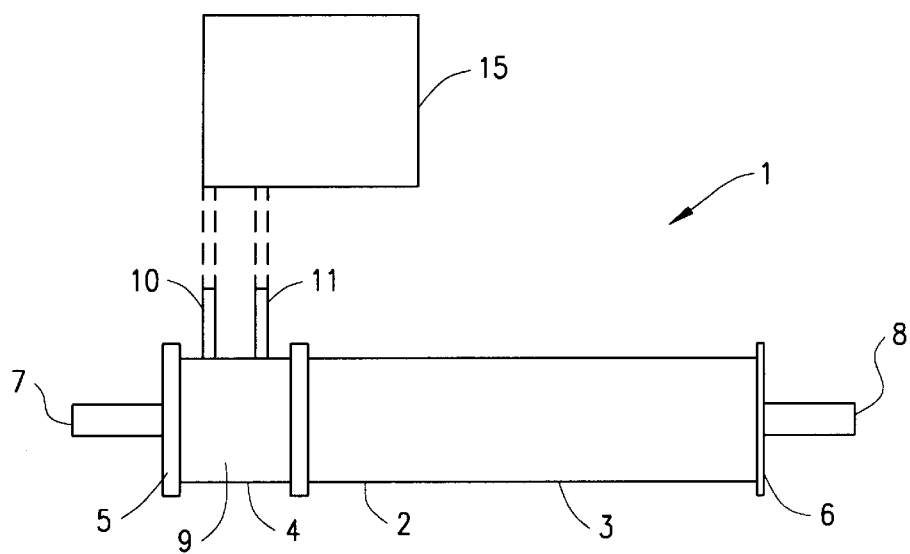
FIG. 1 is a side view of a cooling apparatus.
Figure 2:
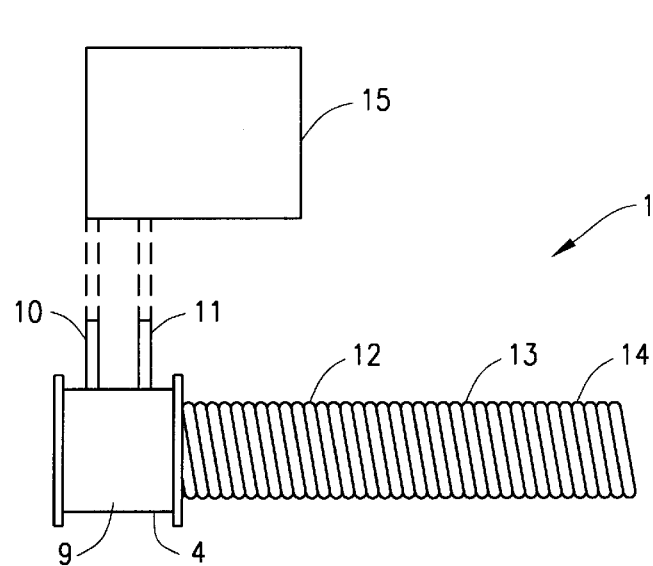
FIG. 2 is a a view of the apparatus of FIG. 1, in a disassembled condition.
Figure 2:
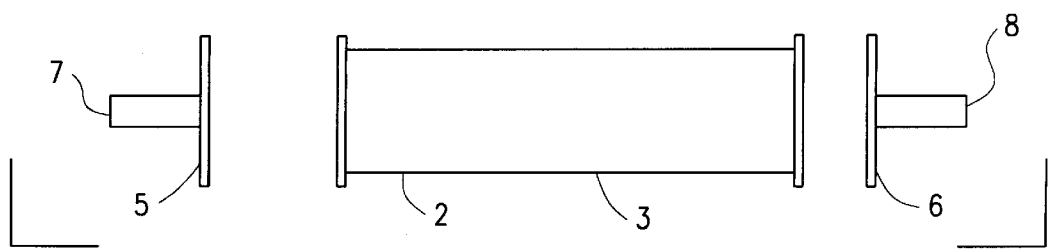

The apparatus 1 shown in FIGS. 1 and 2 includes a casing 2 in the form of a cylindrical sleeve 3, a cooling element 4 and end closure portions 5, 6 which define an inlet 7 and outlet 8 of the apparatus 1. The cooling element 4 includes a collar 9 with refrigerant inlet and outlet ports 10. 11 which are in fluid communication with a refrigerated element 12 which is formed of a tube 13 shape to define a generally hollow cylindrical coil heat exchanger 14. In use, refrigerant is pumped from a refrigeration unit 15 into the inlet port 10, through the tubing of the element 12 and out of the outlet port 11 to thereby refrigerate the coil. In this manner, liquid flowing from the inlet 7 to the outlet 8 will pass through and around the coil, in direct contact with the refrigerated element 12 so as to be chilled to a desired temperature. The element 12 is preferably formed of stainless steel or is titanium plated so that it may be used with food grade liquid, such as milk. The curved surface of the tube 13 helps to minimize fluid flow disturbance as the liquid flows through the apparatus, which is particularly advantageous when the liquid is milk which should be agitated as little as possible.

Figure 3:
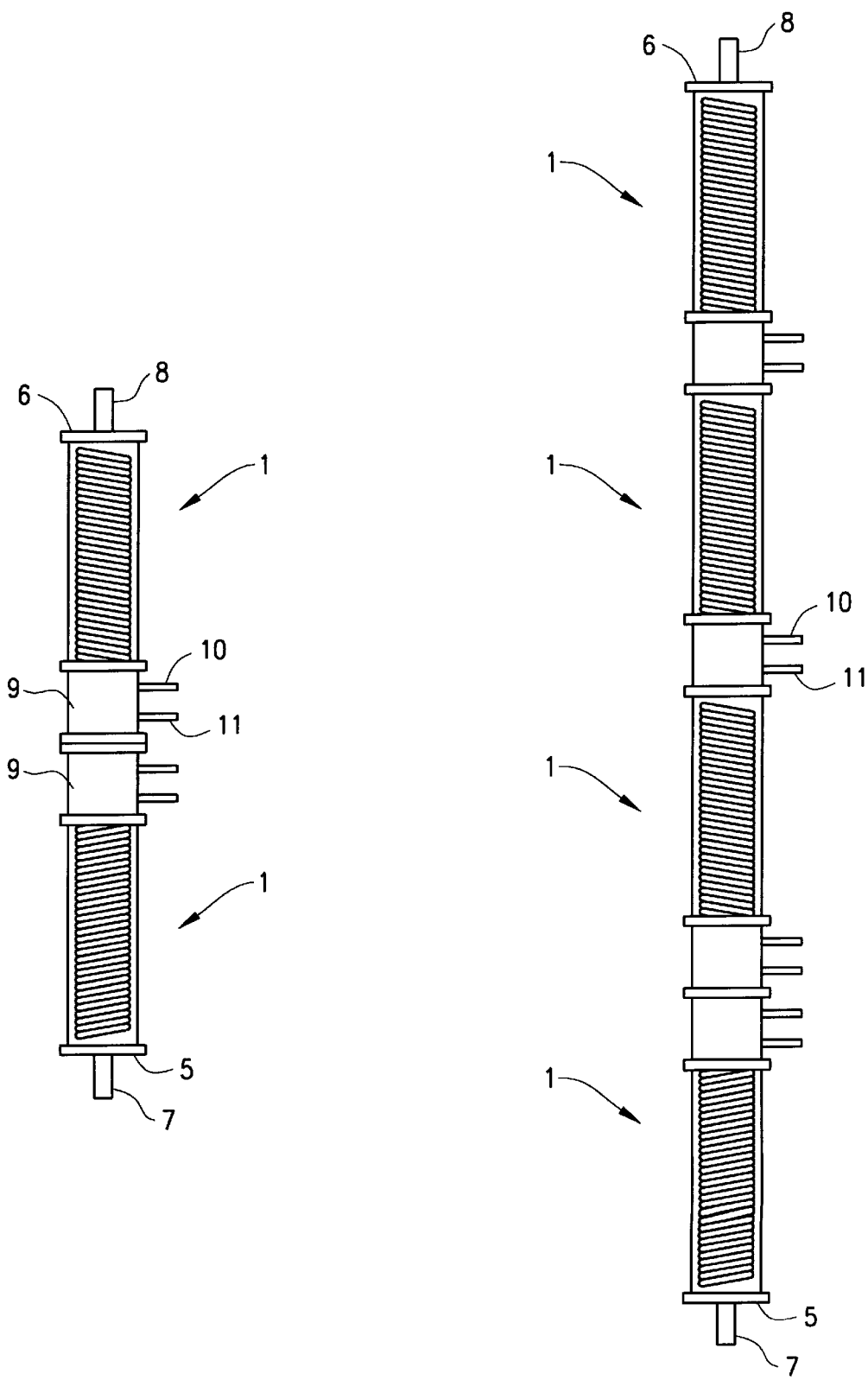
FIG. 3 illustrates a first mode of interconnecting apparatus in accordance with the present invention.
Figure 4:
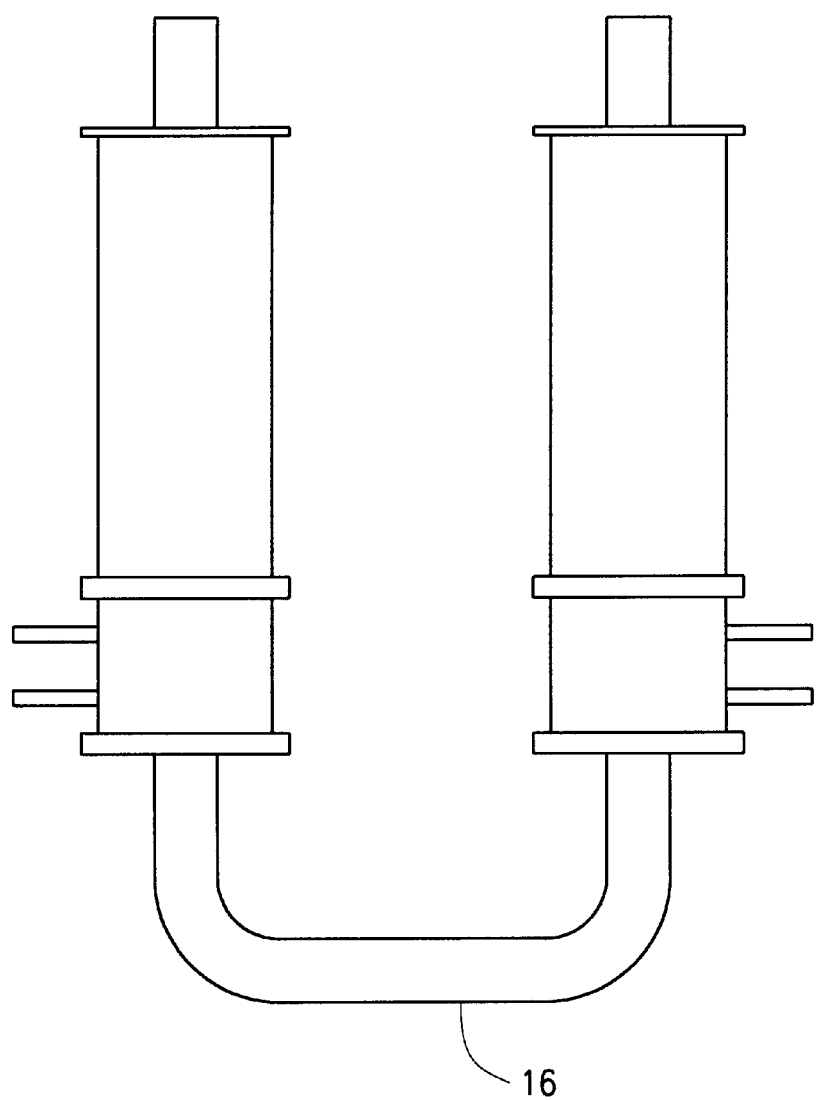
FIG. 4 illustrates a second mode of interconnecting apparatus.

The end portions 5 and 6 are preferably adapted so that an end closure portion of an apparatus may be readily coupled to an associated end portion of another apparatus either directly, in the manner shown in FIG. 3 or via an interconnecting element 16, as shown in FIG. 4 to cater for increased cooling requirements.

Figure 5:
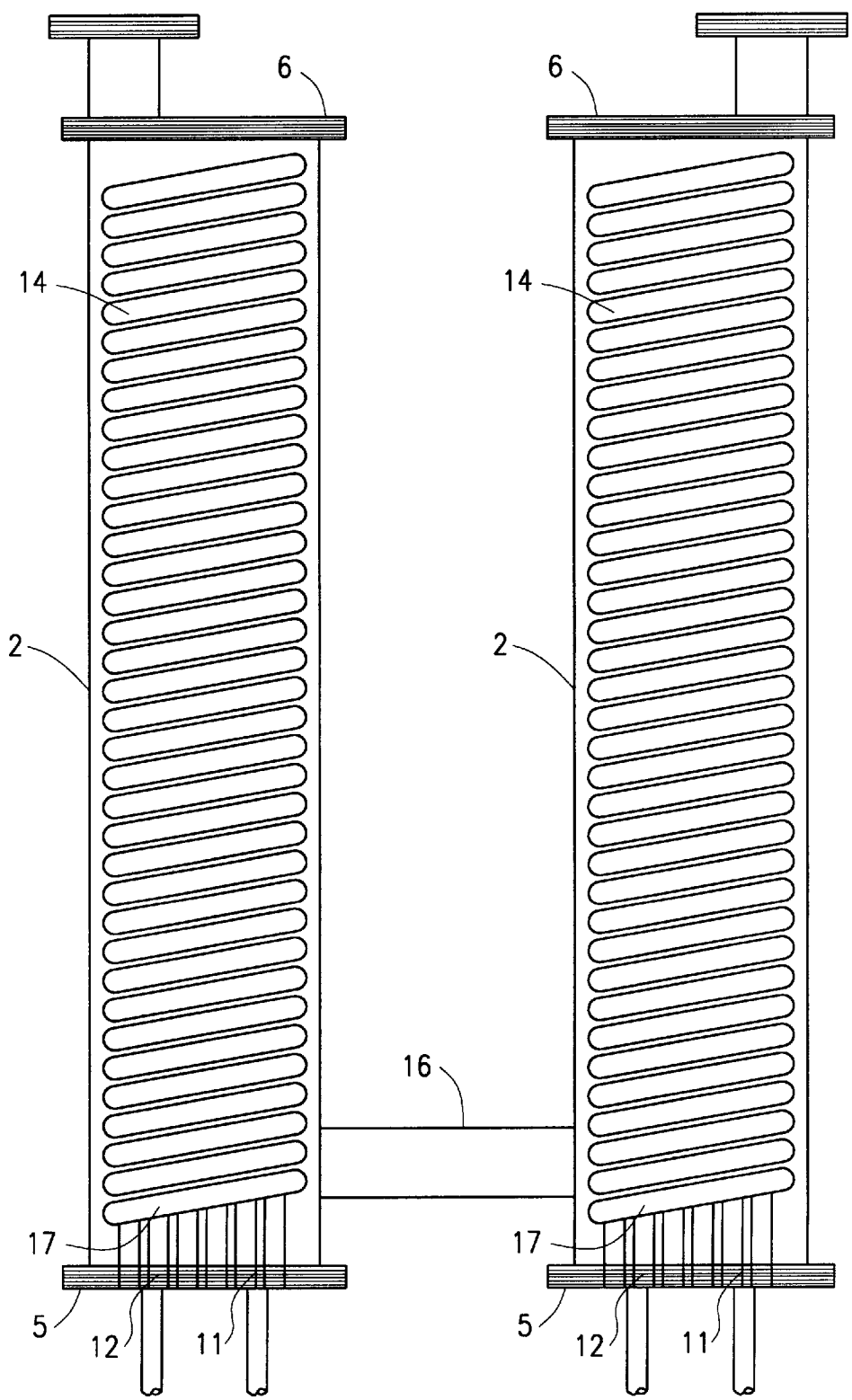
FIG. 5 illustrates a third mode of interconnecting apparatus, in accordance with the present invention.

Another preferred arrangement, as shown in FIG. 5, has the interconnecting element 16 extending directly between casings 2 of adjacent apparatus, and respective inlet and outlet ports 10, 11 (also shown in FIG. 1) provided at an end 17 of each coil so as to be accessible via the associated end portion 5.

Figure 6:
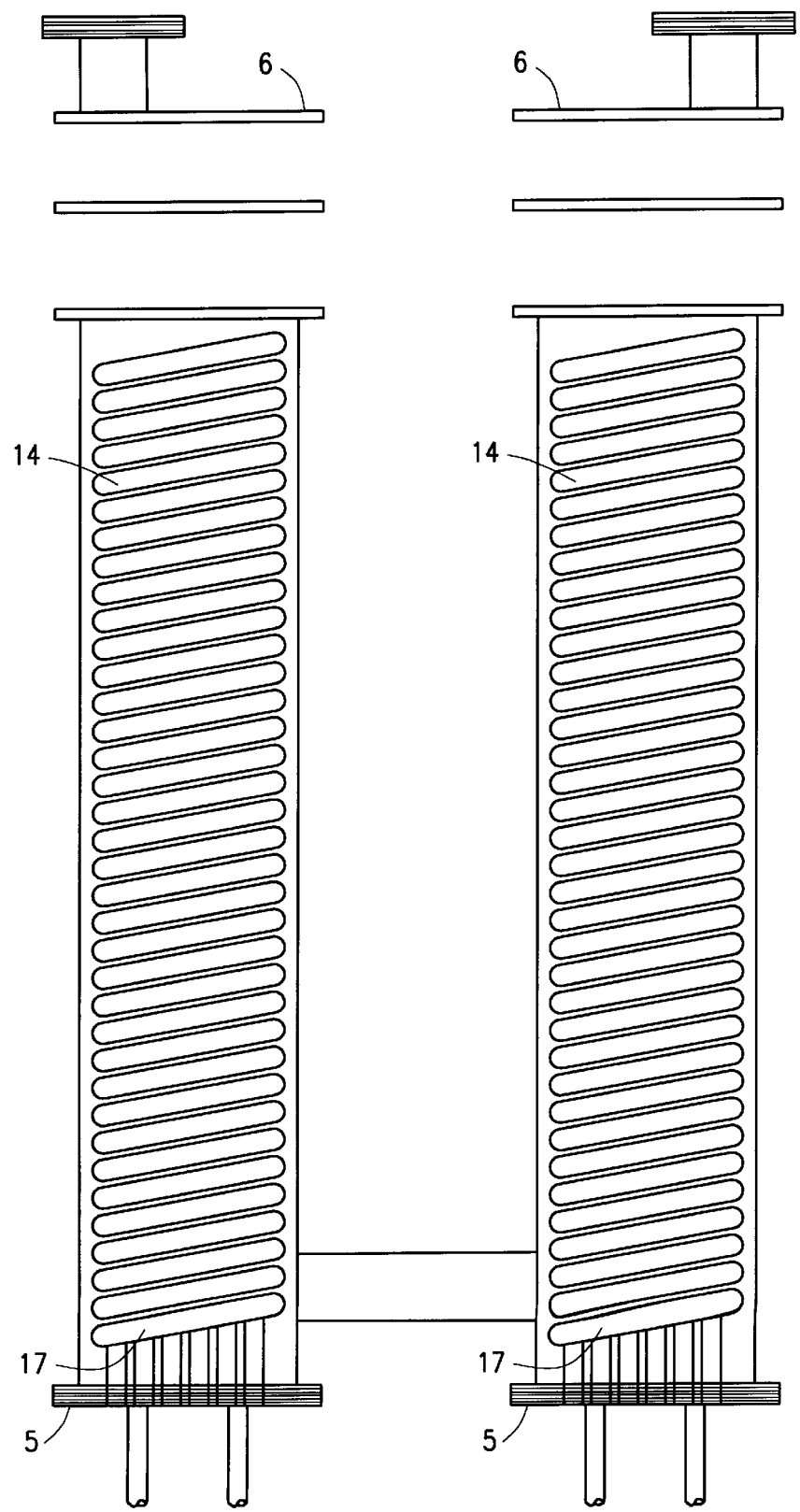
FIG. 6 shows the apparatus of FIG. 5 in a partially dissembled condition.

One or both of the apparatus shown in FIG. 5 may be readily dissembled by removing tie respective closure portion 6, as illustrated in FIG. 6, such as by releasing fastening bolts to allow for quick visual inspection of the coil heat exchanger 14. If the entire apparatus needs to be disassembled, the casing can also be quickly removed by releasing the closure portion 5 and sliding the casing away from the end 17, for detailed inspection or cleaning of the coil heat exchanger 14 or casing 2.

Further, it is possible to use the apparatus in many other modes of operation where heat exchange between liquids is necessary, such as by reversing the cooling operation. For example, the liquid passing through the sleeve may already be cooled for the purpose of chilling a second liquid within the element. This has particular application for cooling beverages such as beer.

Figure 7:
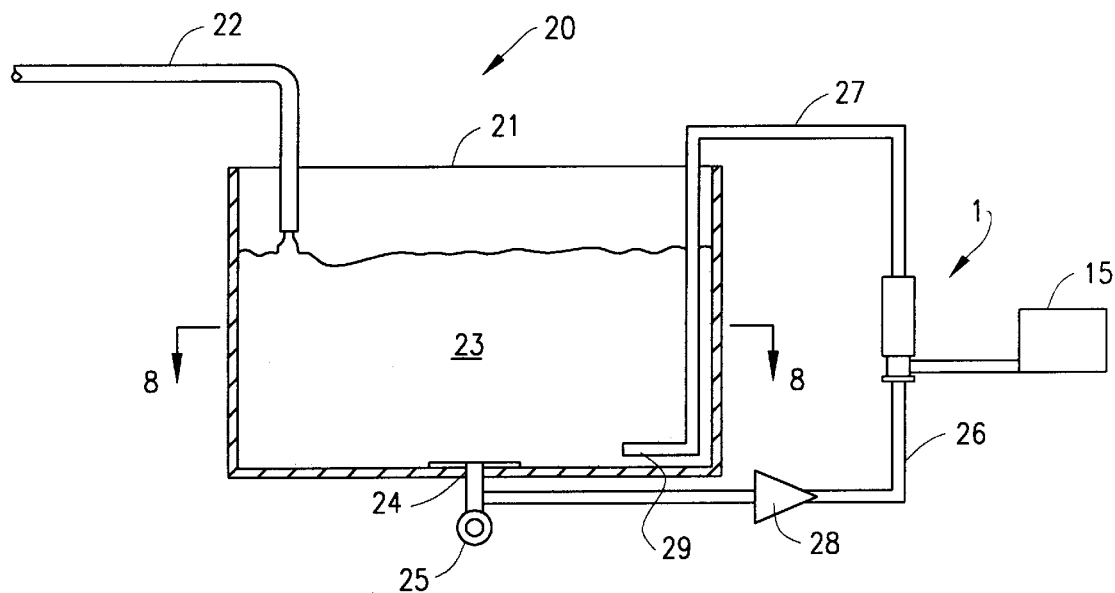
FIG. 7 is a schematic view of the apparatus of FIG. 1 in a cooling system.

The cooling apparatus 1 has particular application in a cooling system 20 in FIG. 7. The system is described with particular reference to the dairy industry but it will be understood that the apparatus 1 and associated system 20 may be equally applicable to other arrangements and environments, such as in the wine industry.

Figure 8:
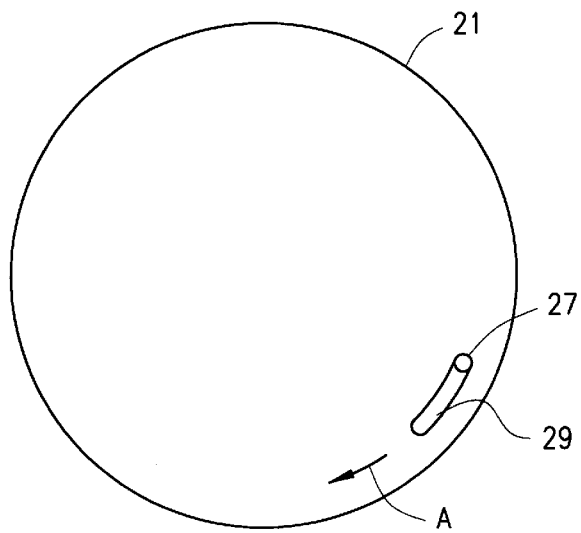
FIG. 8 is a view taken along the line 8—8, shown in FIG. 7.

The system 20 includes a vat 21, a discharge pipe 22 defining a first flow path for transporting cow's milk 23 from a milking station into the vat 21, an exit port 24 which is coupled to valve 25, from which milk is taken from the vat 21 for transport in a milk tanker. The system also includes the above described apparatus which is arranged externally of the vat in a second flow path, for circulating milk from the exit port 24 back into the vat 21 via first and second transfer pipes 26, 27. A pump 28 such as a positive displacement type of pump is provided at a location along the transfer pipe arrangement to effect flow of the milk through the cooling apparatus 1. A lower part 29 of the second transfer pipe, positioned in the vat 21, is arranged as shown in FIG. 8 so that milk which is pumped through the apparatus 1 is discharged back into the vat 21 in a tangential direction with respect to a center of the vat, as illustrated by arrow 'A' so as to create a circular or "whirl pool" type motion of the milk within the vat. Such a motion helps to prevent stratification of the milk and separation of milk particles, without use of mechanical agitation.

The apparatus 1 and associated transfer pipes 26, 27 may be unitarily manufactured with the vat 21 or attached to a pre-existing vat. The provides a significant advantage in that the device may be readily utilised and affixed to a pre-existing system to maintain milk at a desired low temperature in the event that the pre-existing cooling system fails. With reference again to FIG. 7, milk 23 may also flow into the vat 21 via valve 25 and outlet port 24.

In an alternative arrangement, the apparatus 1 may be directly integrated with the discharge pipe 22. As can be appreciated, in either of the arrangements, the apparatus 1 allows for dynamic control of the temperature of the milk, by varying the temperature of the refrigerated element 12 to therefore cater for fluctuations in the temperature or amount of milk which is required to be cooled. Such diversity is not readily available using pre-existing systems.

Figure 9:
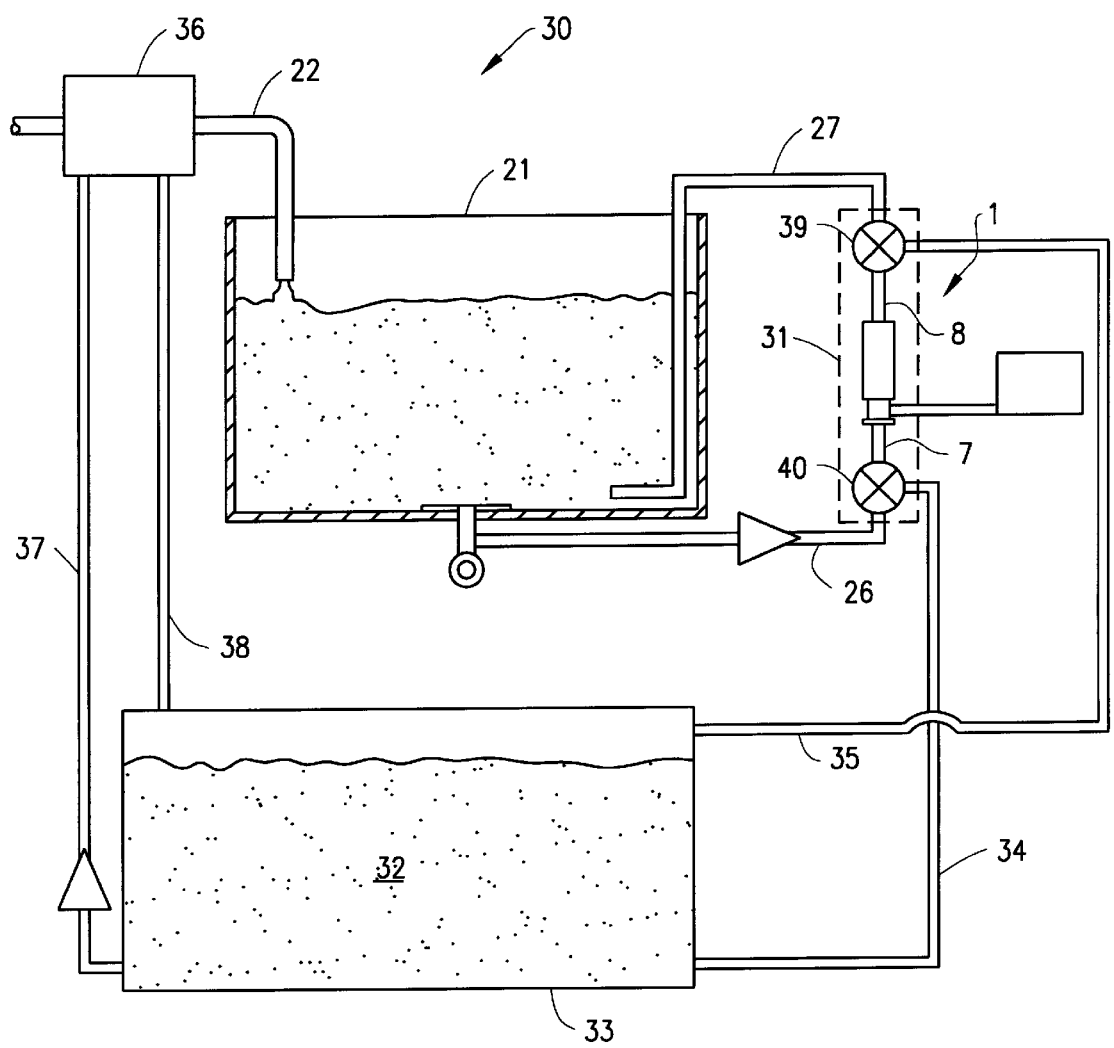
FIG. 9 is a schematic view of an alternative cooling system.

The apparatus may alternatively be used simply for cooling water in a cold water storage tank, 33 or, alternatively, a system 30 may be provided such as shown in FIG. 9, where the apparatus is adapted to be switched between different flow paths or cooling circuits. Specifically, a coupling device 31 is shown which includes two valves 39, 40 to allow the inlet 7 and out 8 of the apparatus to be disconnected from the transfer pipes 26, 27 associated with the milk vat 21, into another cooling circuit for cooling a second liquid 32, such as cold water held in a storage tank 33. In such an arrangement, water is transferred along a third flow path, from the tank 33 to the apparatus 1 via a first pipe 34 and returned to the tank 33 via a second transfer pipe 35. The cold water stored in the tank may be used for any desired application. However, one specific use may be with a conventional plate cooler 36 arranged to cool milk flowing through the discharge pipe 22, via a first conduit 37 and return conduit 38.

In any of the above described cooling systems, a plurality of cooling apparatuses may readily be connected in series in the event of a substantial cooling load. An individual apparatus 1 itself, however, provides the considerable advantage that it allows for food grade liquids to be cooled to any desired temperature. Further, each apparatus is substantially smaller that any of the pre-existing cooling arrangements such as an ice bank tank or cold water storage tank. The system described with reference to FIGS. 3 to 6 provides a considerable advantage in that it may be readily adapted to a pre-existing cooling system, thereby avoiding substantial costs associated with repair or replacement of the system. It may also be used to supplement pre-existing functioning systems in the manner shown FIG. 9. Further, the particular configuration of the lower part 29 of the pipe 27, shown in FIG. 8, avoids the need for a mechanical agitator, and can therefore provide a cost advantage and in the of milk, a quality advantage also. The apparatus may also be easily cleaned by either operating the apparatus during a normal sanitization procedure where the vat itself is washed down, switching into a cleaning fluid flow path or by disassembling the apparatus. Such cleaning would not be readily realized with, for example, existing systems utilizing in line plate heat exchangers.

Finally, the arrangement of the entire system of the invention, whereby the cooling apparatus operates independently of the first flow path, provides a considerable advantage both in so for as isolation and sanitation of the cooling procedure and in the adaptability of the system to per-existing vats.

It is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambit of the invention.

The claims defining the invention are as follows:

1. A cooling system for cooling liquid transferred into a vat along a first flow path, the system including an apparatus for heat exchange with liquid passing therethrough, wherein a second flow path is provided for circulating the liquid in the vat through the apparatus and the second flow path is isolated from the first flow path, wherein the system includes a coupling device which is adapted to selectively connect and disconnect the cooling apparatus between the second flow path and a third flow path the third flow path being for transfer of a second liquid between a storage tank, connected to the coupling device via a pair of transfer pipes arranged to allow flow of the second liquid from the tank to the cooling apparatus and to return the cooled second liquid from the apparatus to the tank, the storage tank being in fluid communication with a plate heat exchanger and first and second conduits being provided to circulate the second liquid from the tank through the heat exchanger and back into the tank.

2. A system as claimed in claim 1 wherein the liquid is milk.

3. A system as claimed in claim 1 wherein the second flow path is external to the vat.

4. The cooling system according to claim 1, wherein the apparatus includes a casing through which the liquid flows and a refrigeration element in the form of a cylindrical coil mounted within the casing, the coil having a refrigerant input and refrigerant output provided at one end thereof and the casing including a closure portion, remote from the one end of the coil, wherein the closure portion is releaseable to allow for inspection of the coil and the casing is adapted to be removed by sliding over the coil in a direction away from the one end.

5. The cooling system as claimed in claim 1, wherein the second flow path is free of one-way valves.

6. A cooling system for cooling liquid transferred into a vat along a first flow path, the system including an apparatus for heat exchange with liquid passing therethrough, wherein a second flow path is provided for circulating the liquid in the vat through the apparatus and the second flow path is isolated from the first flow path, and wherein the apparatus includes a casing through which the liquid flows and a refrigeration element in the form of a cylindrical coil mounted within the casing, the coil having a refrigerant input and refrigerant output provided at one end thereof and the casing including a closure portion, remote from the end of the coil, wherein the closure portion is releasable to allow for inspection of the coil and the casing is adapted to be removed by sliding over the coil in a direction away from the one end.

7. A cooling system as claimed in claim 6, wherein the system includes a coupling device which is adapted to selectively connect and disconnect the cooling apparatus between the second flow path and a third flow path, the third flow path being for transfer of a second liquid between a storage tank, connected to the coupling device via a pair of transfer pipes arranged to allow flow of the second liquid from the tank to the cooling apparatus and to return the cooled second liquid from the apparatus to the tank, the storage tank being in fluid communication with a plate heat exchanger and first and second conduits being provided to circulate the second liquid from the tank through the heat exchanger and back into the tank.

8. A cooling system as claimed in claim 6, wherein the liquid is milk.

9. A cooling system as claimed in claim 6, wherein the second flow path is external to the vat.

10. A cooling system as claimed in claim 6, wherein the apparatus includes a casing through which the liquid flows and a refrigeration element in the form of a cylindrical coil mounted within the casing, the coil having a refrigerant input and refrigerant output provided at one end thereof and the casing including a closure portion, remote from the one end of the coil, wherein the closure portion is releaseable to allow for inspection of the coil and the casing is adapted to be removed by sliding over the coil in a direction away from the one end.

11. A cooling system as claimed in claim 6, wherein the second flow path is free of one-way valves.

* * * * *